US010800366B2

(12) United States Patent
Adler et al.

(10) Patent No.: US 10,800,366 B2
(45) Date of Patent: Oct. 13, 2020

(54) MOTOR VEHICLE

(71) Applicant: Bayerische Motoren Werke Aktiengesellschaft, Munich (DE)

(72) Inventors: Stefan Adler, Munich (DE); Tilo Renz, Gilching (DE); Thomas Riedenbauer, Munich (DE); Bernhard Speth, Wolnzach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 32 days.

(21) Appl. No.: 16/220,070

(22) Filed: Dec. 14, 2018

(65) Prior Publication Data

US 2019/0118747 A1    Apr. 25, 2019

Related U.S. Application Data

(63) Continuation of application No. PCT/EP2017/064091, filed on Jun. 9, 2017.

(30) Foreign Application Priority Data

Jun. 17, 2016  (DE) .......................... 10 2016 210 880

(51) Int. Cl.
*B60R 19/04* (2006.01)
*B62D 25/08* (2006.01)

(52) U.S. Cl.
CPC ............ *B60R 19/04* (2013.01); *B62D 25/082* (2013.01)

(58) Field of Classification Search
CPC .......... B60R 19/04; B60R 19/34; B60R 19/03

USPC .................................. 296/102; 293/102, 146
See application file for complete search history.

(56) References Cited

U.S. PATENT DOCUMENTS

| 1,407,637 A | * | 2/1922 | Coletta | ................... B60R 21/34 293/137 |
| 3,361,467 A | * | 1/1968 | Ludwikowski | ......... B60R 19/36 293/136 |
| 3,848,886 A | * | 11/1974 | Feustel | .................... B60R 19/34 280/784 |
| 3,850,466 A | * | 11/1974 | Yepis | ...................... B60R 19/26 293/132 |
| 3,860,258 A | * | 1/1975 | Feustel | .................... B60R 19/34 180/312 |
| 3,877,741 A | * | 4/1975 | Wilfert | .................... B60R 19/04 293/132 |

(Continued)

FOREIGN PATENT DOCUMENTS

| CN | 105313980 A | 2/2016 |
| DE | 102 34 045 A1 | 2/2004 |

(Continued)

OTHER PUBLICATIONS

International Search Report (PCT/ISA/210) issued in PCT Application No. PCT/EP2017/064091 dated Aug. 16, 2017 with English translation (eight pages).

(Continued)

*Primary Examiner* — Dennis H Pedder
(74) *Attorney, Agent, or Firm* — Crowell & Moring LLP

(57) ABSTRACT

A motor vehicle has a body, two spaced-apart longitudinal members, a bumper assembly as well as a second bumper cross-member which is spaced apart from the first bumper cross-member.

18 Claims, 12 Drawing Sheets

(56) References Cited

U.S. PATENT DOCUMENTS

| | | | | |
|---|---|---|---|---|
| 4,031,978 | A * | 6/1977 | Taylor | B60R 19/26 180/232 |
| 4,807,915 | A * | 2/1989 | Shyi | B60R 19/36 267/139 |
| 5,277,462 | A * | 1/1994 | Verzelli | B60R 19/18 293/120 |
| 6,007,123 | A * | 12/1999 | Schwartz | B60R 19/00 293/124 |
| 6,106,039 | A * | 8/2000 | Maki | B60R 19/12 293/132 |
| 6,428,065 | B2 * | 8/2002 | Sato | B60R 19/12 293/102 |
| 6,764,119 | B2 * | 7/2004 | Bladow | B60R 19/18 293/102 |
| 7,625,022 | B2 * | 12/2009 | Toneatti | B60R 19/18 293/120 |
| 7,850,228 | B2 * | 12/2010 | Asai | B62D 21/152 296/203.02 |
| 8,136,855 | B2 * | 3/2012 | Toneatti | B60R 19/18 293/133 |
| 8,454,080 | B2 * | 6/2013 | Qu | B60R 19/34 293/133 |
| 8,807,597 | B2 * | 8/2014 | Akaki | B62D 21/02 180/232 |
| 2011/0133512 | A1 * | 6/2011 | Mildner | B60R 19/36 296/187.09 |
| 2012/0248820 | A1 * | 10/2012 | Yasui | B60R 19/34 296/187.09 |
| 2013/0069377 | A1 * | 3/2013 | Qu | B60R 19/34 293/133 |

FOREIGN PATENT DOCUMENTS

| | | |
|---|---|---|
| DE | 10 2009 008 674 A1 | 8/2010 |
| DE | 10 2011 010 174 A1 | 8/2012 |
| EP | 2 322 387 A1 | 5/2011 |
| EP | 2 511 160 A1 | 10/2012 |
| GB | 2476094 A | 6/2011 |

OTHER PUBLICATIONS

German-language Search Report issued in counterpart German Application No. 10 2016 210 880.8 dated Apr. 11, 2017 with partial English translation (14 pages).

"Standard No. 301; Fuel system integrity", Code of Federal Regulations, Title 49—Transportation, Part 571—Federal Motor Vehicle Safety Standards, Authenticated U.S. Government Information, Oct. 1, 2015, pp. 1048-1056, https://www.gpo.gov/fdsys/pkg/CFR-2015-title49-vol6/pdf/CFR-2015-title49-vol6-sec571-301.pdf (nine pages).

"Standard No. 305; Electric-Powered Vehicles: Electrolyte Spillage and Electrical Shock Protection", Code of Federal Regulations, Title 49—Transportation, Part 571—Federal Motor Vehicle Safety Standards, Authenticated U.S. Government Information, Oct. 1, 2015, pp. 1065-1073, https://www.gpo.gov/fdsys/pkg/CFR-2015-title49-vol6/pdf/CFR-2015-title49-vol6-sec571-305.pdf (nine pages).

* cited by examiner

MOTOR VEHICLE

CROSS REFERENCE TO RELATED APPLICATIONS

This application is a continuation of PCT International Application No. PCT/EP2017/064091, filed Jun. 9, 2017, which claims priority under 35 U.S.C. § 119 from German Patent Application No. 10 2016 210 880.8, filed Jun. 17, 2016, the entire disclosures of which are herein expressly incorporated by reference.

BACKGROUND AND SUMMARY OF THE INVENTION

The invention relates to a motor vehicle having a body, two-spaced apart longitudinal members and a bumper assembly.

A motor vehicle in which a bumper assembly is provided is disclosed in DE 102 34 045 A1. The bumper assembly has a bumper cross-member which is connected at each side to one respective longitudinal member of a vehicle body via a first and a second deformation element as a typical accident damage element which is oriented approximately in the vehicle longitudinal direction. The connection of the respective deformation element to a front face of the (body) longitudinal member is carried out via at least one flange which, in each case, is provided at one end of the deformation element and/or at the end of the respective longitudinal member.

The prevailing US safety regulations of the Federal Motor Vehicle Safety Standard (FMVSS), such as FMVSS No. 301 and FMVSS No. 305, relate to a predetermined rear impact, the rear bumper carrier contributing to the fulfillment of said regulations. In order to fulfil the US safety regulations, tests have been carried out in which a moving deformable vehicle strikes a rear region of a motor vehicle to be tested at a predetermined speed.

During the impact, the moving deformable vehicle does not overlap the rear region of the motor vehicle to be tested by 100%, but rather only partially. The overlap may, for example, be 70 percent and/or the offset may thus, for example, be 30 percent.

By the impact of the moving deformable vehicle on the rear region of the motor vehicle to be tested, the overlapped vehicle side of the motor vehicle to be tested is generally deformed to a greater extent than the non-overlapped vehicle side.

It is the object of the invention to provide a motor vehicle with a rear bumper assembly which ensures that safety-relevant components arranged in the rear region remain as undamaged as possible.

A motor vehicle according to the invention has a body with an underbody. In a region of a vehicle rear, two spaced-apart longitudinal members extend parallel to the vehicle longitudinal direction as far as the vehicle rear. A bumper cross-member of a bumper assembly is connected via one respective deformation element to the respective longitudinal member.

Advantageously, a second bumper cross-member is arranged spaced-apart from the first bumper cross-member in the vehicle longitudinal direction. In the event of a rear crash, therefore, the crash energy or impact energy may be progressively dissipated.

In an advantageous embodiment, the second bumper cross-member is arranged spaced-apart by at least the length of the respective deformation element from the first bumper cross-member in the vehicle longitudinal direction.

The first bumper cross-member is advantageously a closed profile with at least one cavity. In a further advantageous embodiment, the first bumper cross-member is an open profile.

Advantageously, the first bumper cross-member is produced from a light metal or from steel.

In an advantageous embodiment, the second bumper cross-member is arranged eccentrically relative to the first bumper cross-member. In a further advantageous embodiment, the second bumper cross-member is arranged centrally relative to the first bumper cross-member.

The second bumper cross-member advantageously has a rectangular cross section. In a further advantageous embodiment, the second bumper cross-member has a cross-sectional profile increasing the geometrical moment of inertia.

In an advantageous embodiment, the second bumper cross-member is produced from a light metal. In a further advantageous embodiment, the second bumper cross-member is made from steel. In a further advantageous embodiment, the second bumper cross-member is a textile strip and/or a carbon fiber-reinforced plastics material (CFRP).

In the bumper assembly, the first bumper cross-member is advantageously a closed profile with at least one cavity and is produced from steel or from a light metal and the second bumper cross-member spaced-apart therefrom is advantageously produced from steel or from a light metal or from a textile strip and/or from a carbon fiber-reinforced plastics material (CFRP).

In an advantageous embodiment, in the bumper assembly the first bumper cross-member is an open profile and is produced from steel or from a light metal and the second bumper cross-member spaced-apart therefrom is produced from steel or from a light metal or from a textile strip and/or from a carbon fiber-reinforced plastics material (CFRP).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
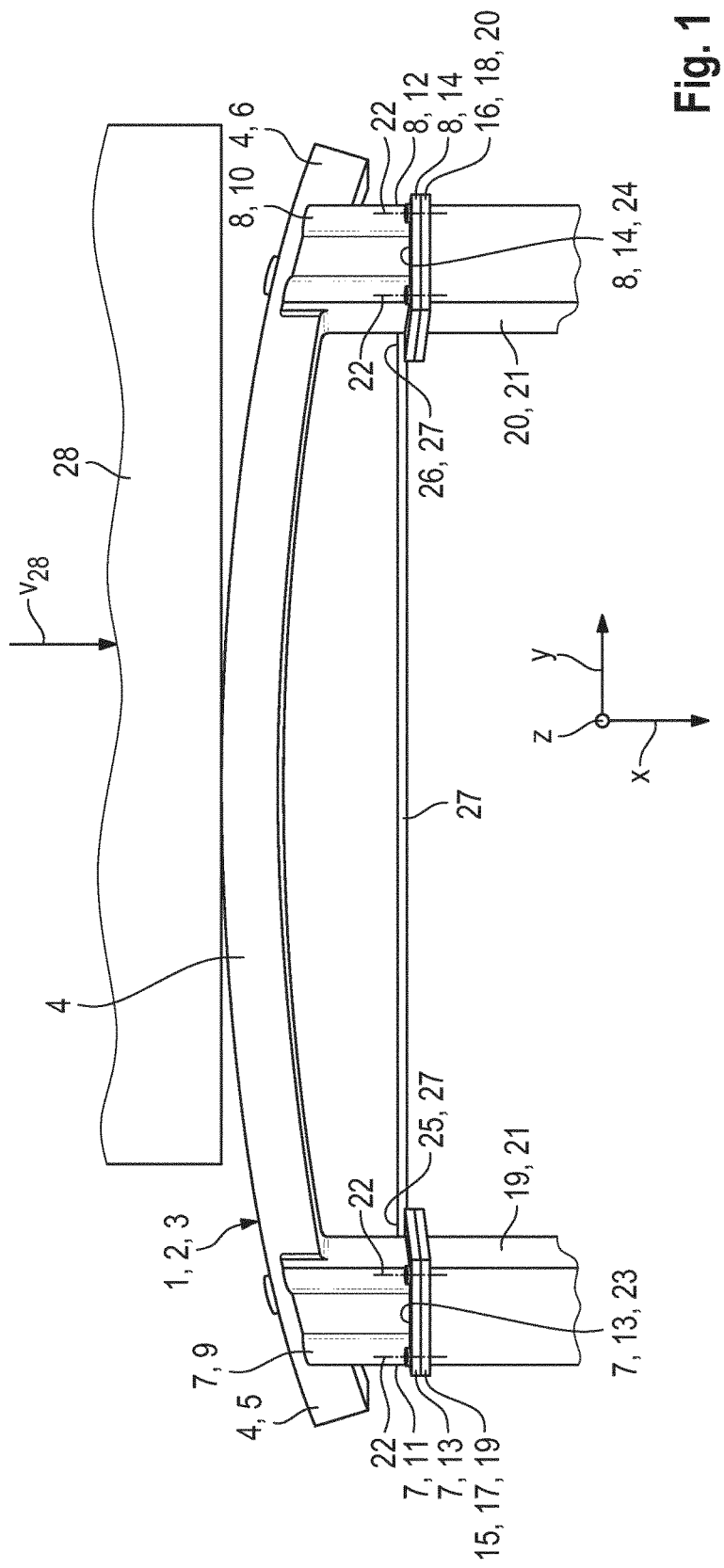
FIG. 1 is a view from above of a first embodiment of a rear bumper assembly shown as a basic sketch, with two spaced-apart bumper cross-members.

FIG. 1 shows a bumper assembly 3 on a rear 2 of a motor vehicle 1 (not shown further). The rear bumper assembly 2 ensures that safety-relevant components arranged in the rear region, or components such as a fuel tank and/or a (high voltage) battery or electrical components or the like, remain substantially undamaged in the event of a rear crash, which is relevant in terms of safety.

The bumper assembly 3 has a bumper cross-member 4 which extends substantially in the vehicle transverse direction y. In the embodiment shown, the bumper cross-member 4 has a curvature oriented away from the motor vehicle 1.

On one respective lateral end 5 and 6 of the bumper cross-member 4 in each case an end 9, 10 of a deformation element 7 and 8 is fastened to the bumper cross-member 4. In the embodiment shown, a flange plate 13, 14 is arranged on an end 11, 12 of the respective deformation element 7, 8 opposing this lateral end.

The respective flange plate 13, 14 in each case bears against a flange plate 15, 16 of, in each case, a longitudinal member 19, 20 of a body 21 of the motor vehicle. The respective flange plate 13, 14 is, for example, fastened via a screw connection 22 to an end 17, 18 on the front face. In each case an end 25, 26 configured as a flange 31, 32 of a second bumper cross-member 27 is fastened to one respective outer face 23, 24 of the respective flange plate 13, 14 on the respective deformation element 7, 8 facing the bumper cross-member 4.

For example, a movable barrier 28 corresponding to the US regulation FMVSS is shown behind of the bumper cross-member 4, said barrier striking the rear 2 of the motor vehicle 1 at a predetermined speed $v_{28}$, with a predetermined degree of overlap in the vehicle transverse direction y and with a predetermined energy in a crash test.

In a crash test corresponding to FMVSS301, the test barrier 28 strikes against the rear 2 of the motor vehicle 1 at a speed $v_{28,\ FMVSS301}$=80 km/h+/−1 km/h with about 80% overlap of the vehicle rear 2.

Figure 2:
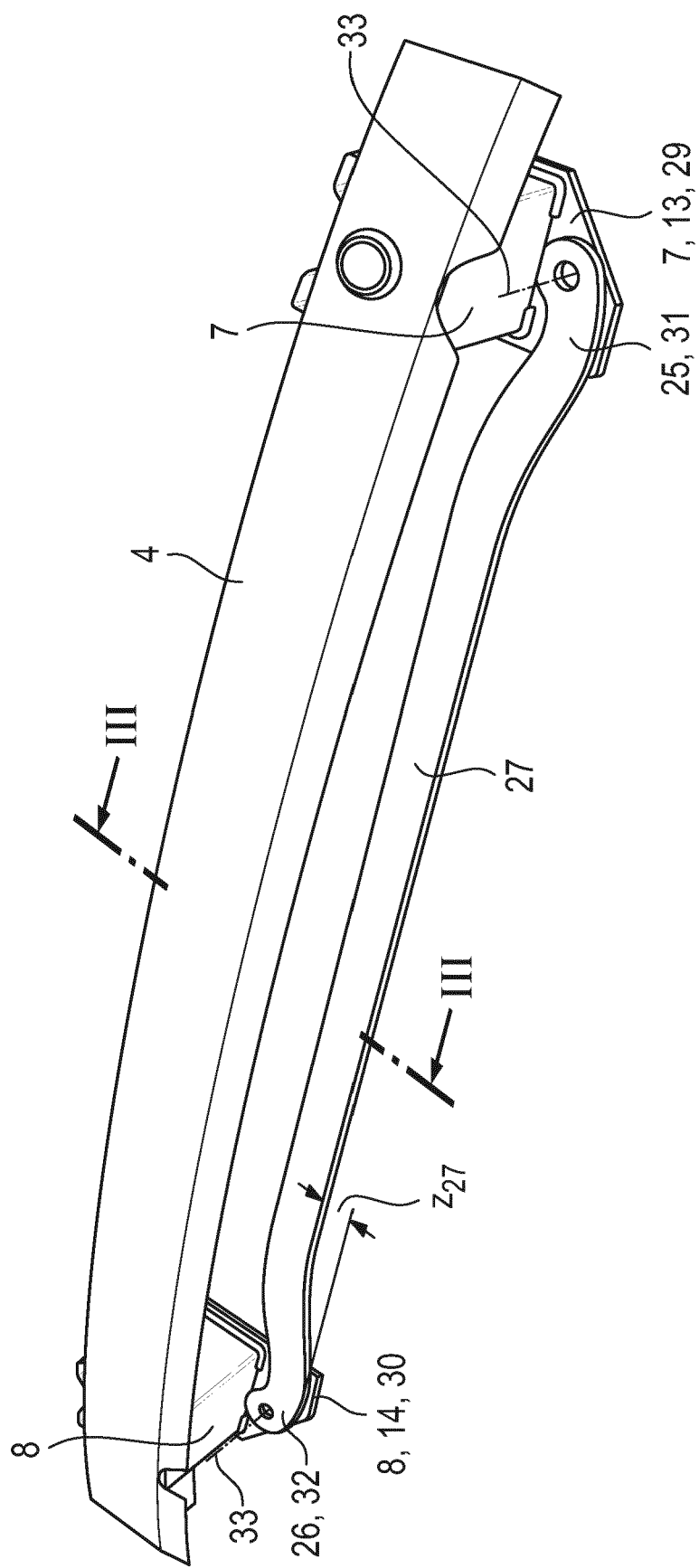
FIG. 2 is a perspective view obliquely from the rear, viewed from below in the vehicle longitudinal direction x, of the first embodiment of a bumper assembly shown in FIG. 1.

From the perspective view of FIG. 2, it is shown that the respective flange plate 13, 14 of the respective deformation element 7, 8 has a protruding flange portion 29, 30. In each case the flange portion 31, 32 of the second bumper cross-member 27 is fastened, for example, via a screw connection 33 to the respective flange portion 29, 30 of the respective flange plate 13, 14.

The second bumper cross-member 27 has a vertical offset $z_{27}$ extending in the z-direction. The offset $z_{27}$ in the vertical direction may be selected such that an outer face 34 of the first bumper cross-member 4 facing the second bumper cross-member 27, in a state pushed-in by the barrier 28, bears against an outer face 35 of the second bumper cross-member 27 facing the outer face 34 of the first bumper cross-member 4, ideally for support.

Figure 3:
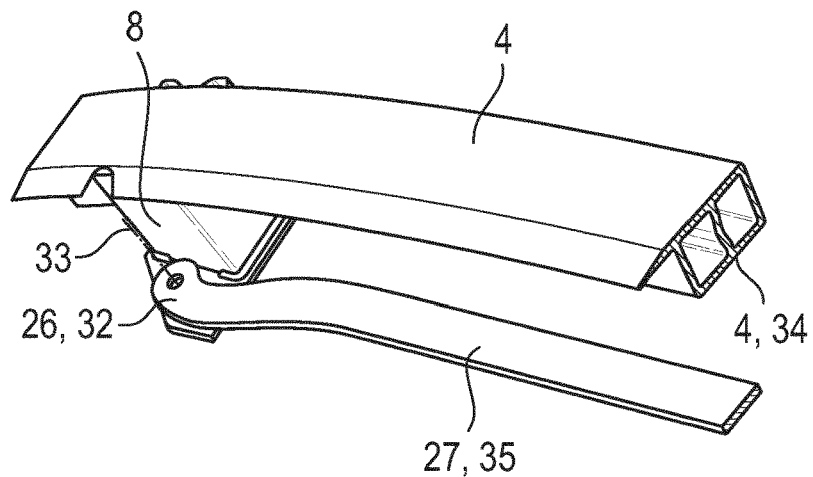
FIG. 3 is a perspective sectional view along the line III-III of FIG. 2.
Figure 4:
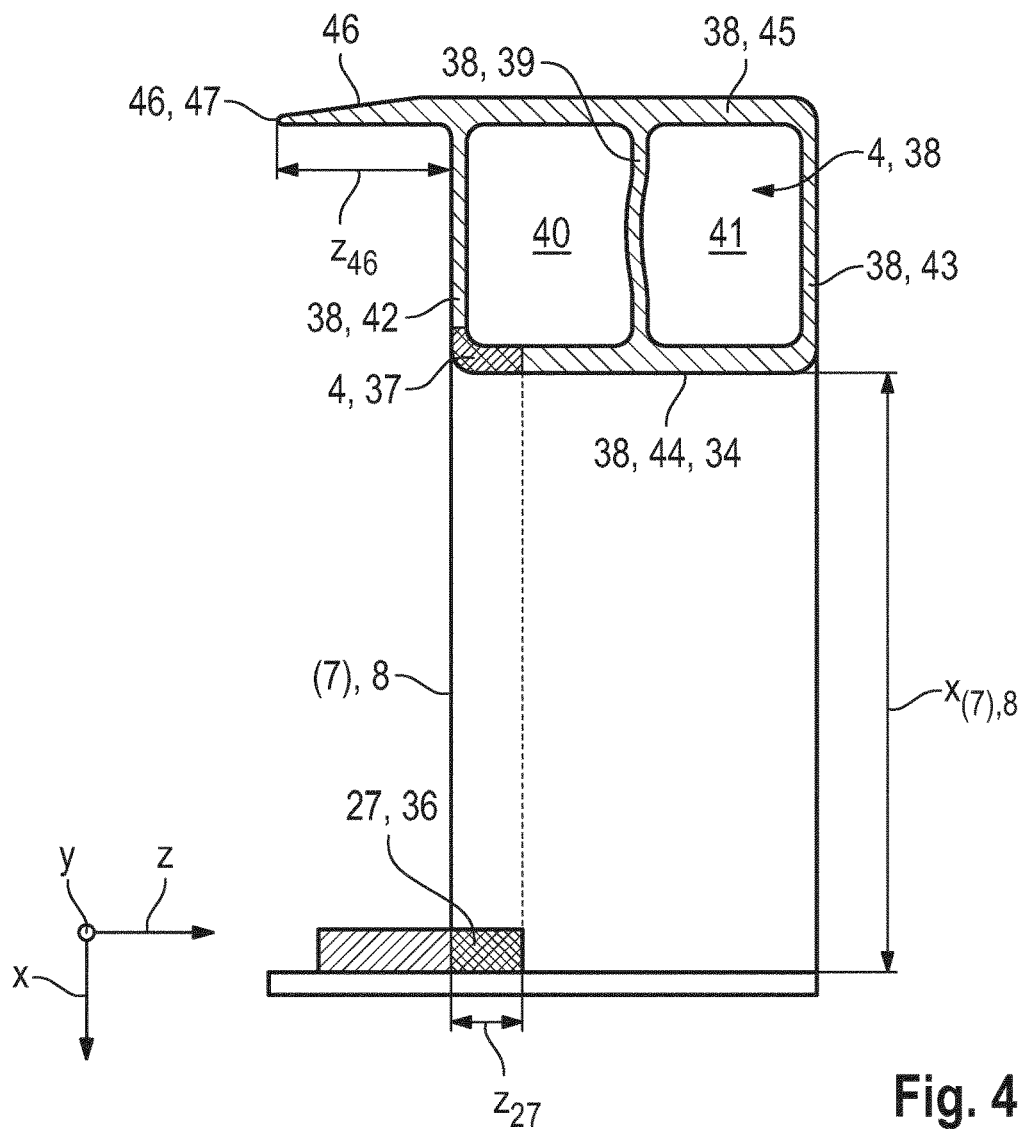
FIG. 4 is a partially shown cross-sectional view corresponding to FIG. 3.

From the cross-sectional views of FIGS. 3 and 4, it is shown that by the offset $z_{27}$ in the vertical direction a cross-sectional portion 36 shown hatched in FIG. 4 overlaps an opposing portion 37 on the outer face 34 of the first bumper cross-member 4, shown hatched. In the embodiment shown, the second bumper cross-member 27 has a rectangular cross section and is configured as a flat component.

As is shown in FIGS. 3 and 4, the bumper cross-member 4 has a hollow profile 38 which is divided by a transverse web 39, so that two cavities 40, 41 are formed one above the other in the vertical direction z. The hollow profile 38 in the embodiment shown has an upper and a lower outer web 42, 43 which define the bumper cross-member 4 in the vertical direction z.

In the vehicle longitudinal direction x in the direction of the second bumper cross-member 27, an outer web 44 is integrally connected to the webs 39, 42, 43. Opposite the outer web 44, an outer web 45 is connected in an integral manner to the webs 39, 42, 43.

The outer web 45 has, in the embodiment shown, a flange portion 46 extending in the direction of a road, not shown. A length $z_{46}$ of the flange portion 46 is dimensioned such that a predetermined minimum spacing between a road surface and an end 47 of the flange portion 46 is maintained.

Figure 5:
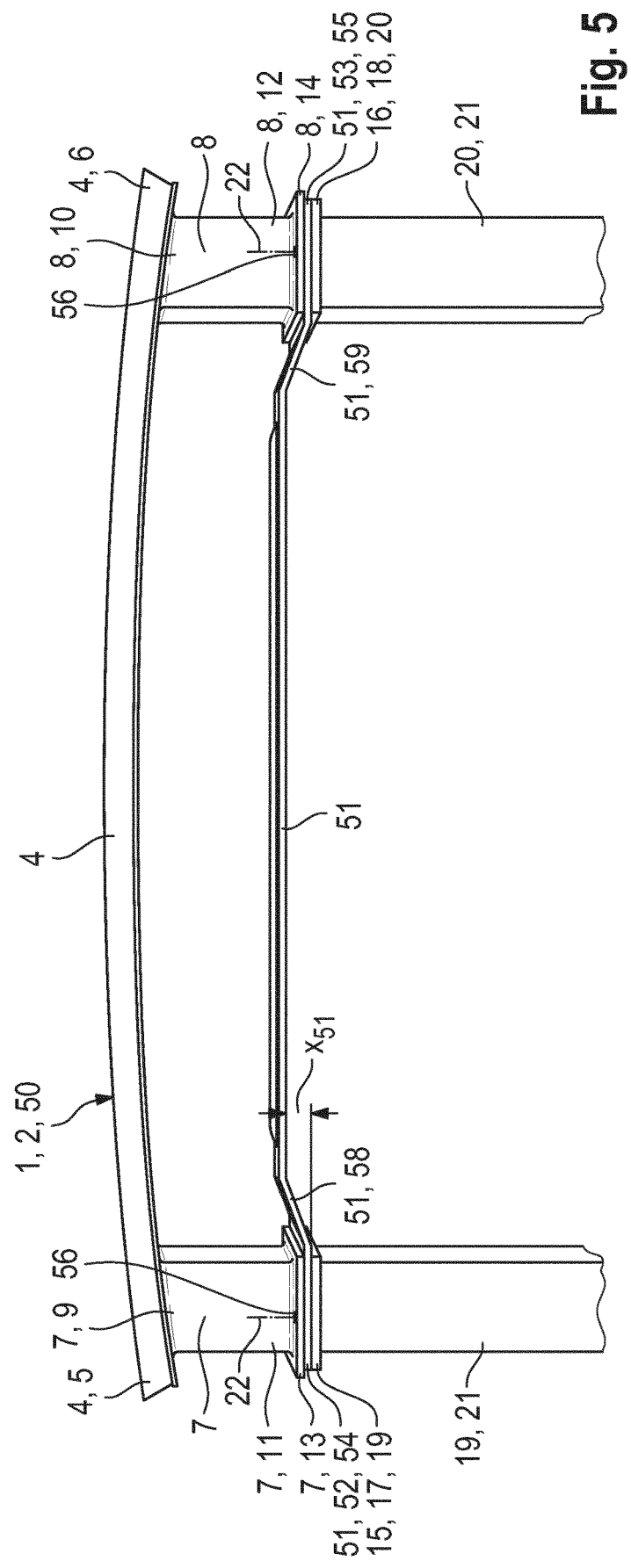
FIG. 5 is a view from above corresponding to FIG. 1, which shows a second embodiment of a bumper assembly.

FIG. 5 shows a second embodiment of a bumper assembly 50. The same components as in the first embodiment shown in FIGS. 1 to 4 of a bumper assembly 3 are provided with the same reference numerals.

In contrast to the second bumper cross-member 27 of the bumper assembly 3 in FIGS. 1-4, here the second bumper cross-member 51 of the bumper assembly 50 is offset by an amount $x_{51}$ in the direction of the first bumper cross-member 4 in the vehicle longitudinal direction x, as is shown in FIG. 5.

Figure 6:
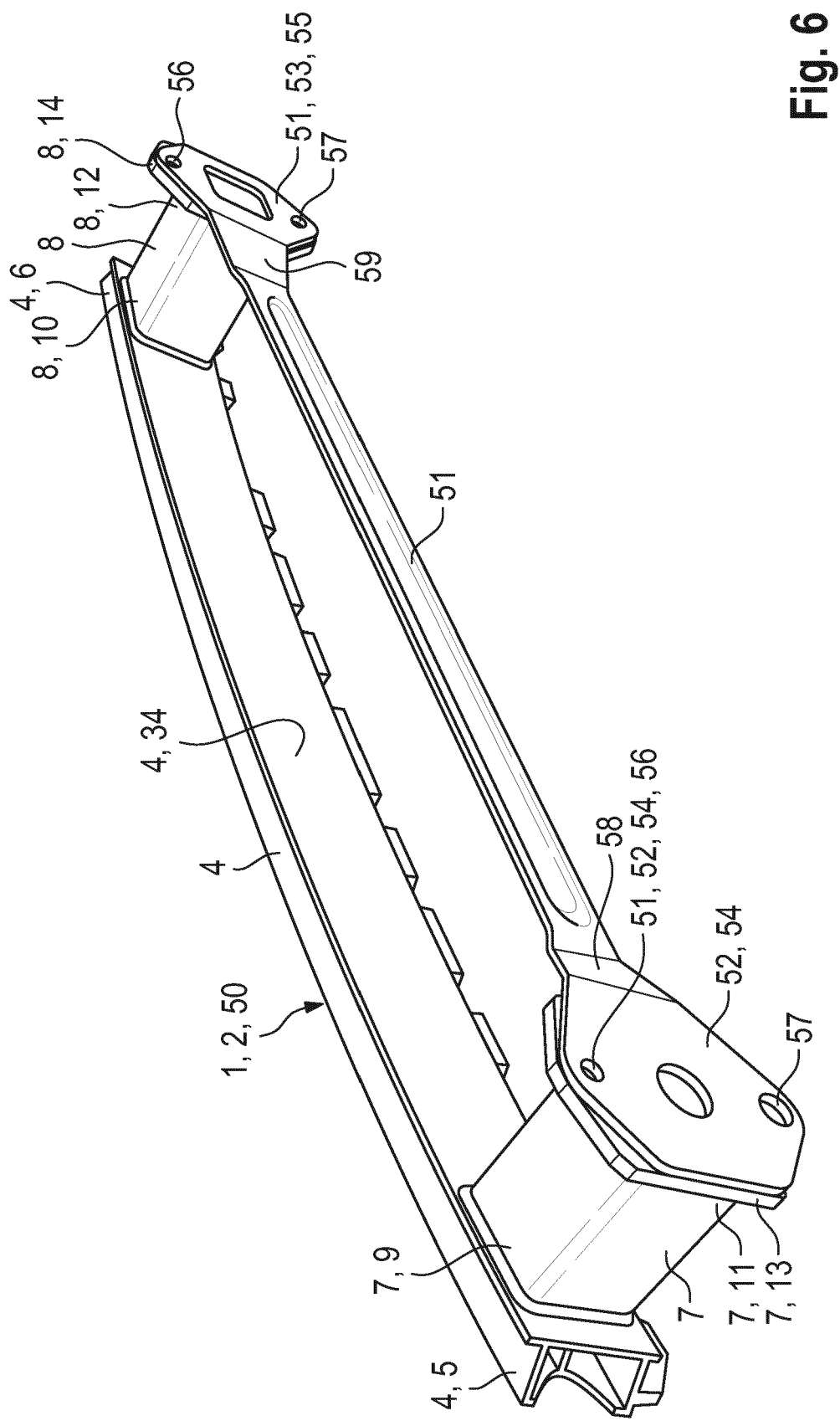
FIG. 6 is a perspective view obliquely from the front, i.e. from the vehicle in the direction of the rear, of the second embodiment of a bumper assembly shown in FIG. 5.
Figure 7:
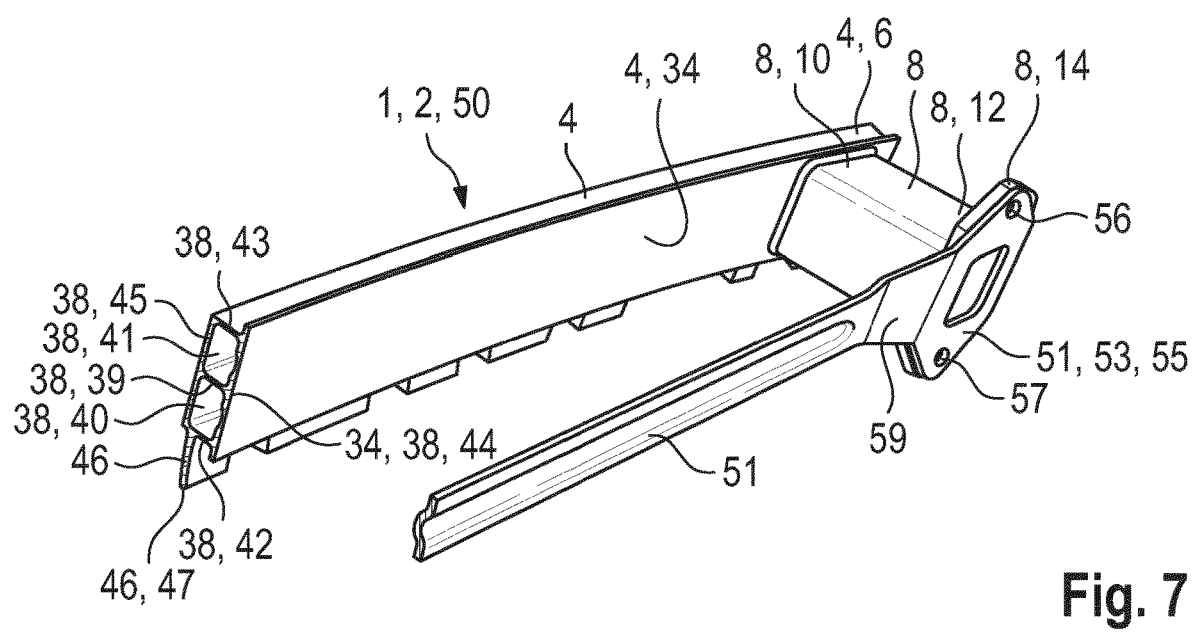
FIG. 7 is a perspective cross-sectional view corresponding to FIG. 6.

Moreover, the bumper cross-member 51 of the bumper assembly 50 has a U-shaped cross section, as is shown in FIGS. 6 and 7, instead of a rectangular cross section as in the case of the bumper cross-member 27 of the bumper assembly 3.

In a further embodiment, the cross section of the second bumper cross-member has a low profile. The profiling of the cross section of the second bumper cross-member serves for increasing the geometric moment of inertia.

The bumper cross-member 51 has on its opposing ends 52 and 53 in each case a flange plate 54, 55. Through-openings 56, 57 for fasteners are provided on the respective flange plate 54, 55.

The offset $x_{51}$ shown in FIG. 5 is achieved by a bumper cross-member portion 58, 59, which is curved or angled-back in the direction of the bumper cross-member 4, being formed on the respective flange plate 54, 55. In a further embodiment the offset $x_{51}$ is zero.

Figure 8:
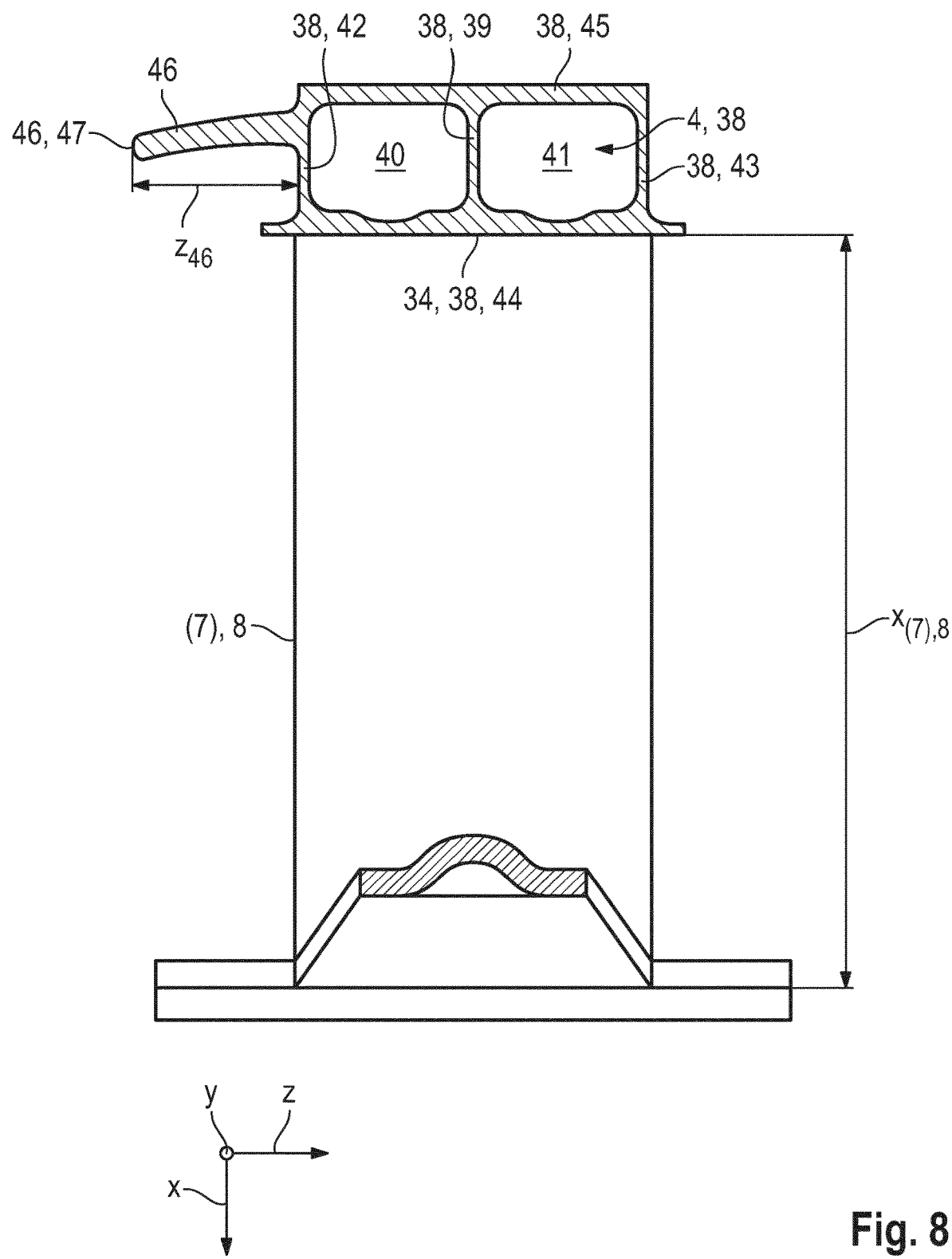
FIG. 8 is a partially shown cross-sectional view corresponding to FIG. 7.
Figure 9:
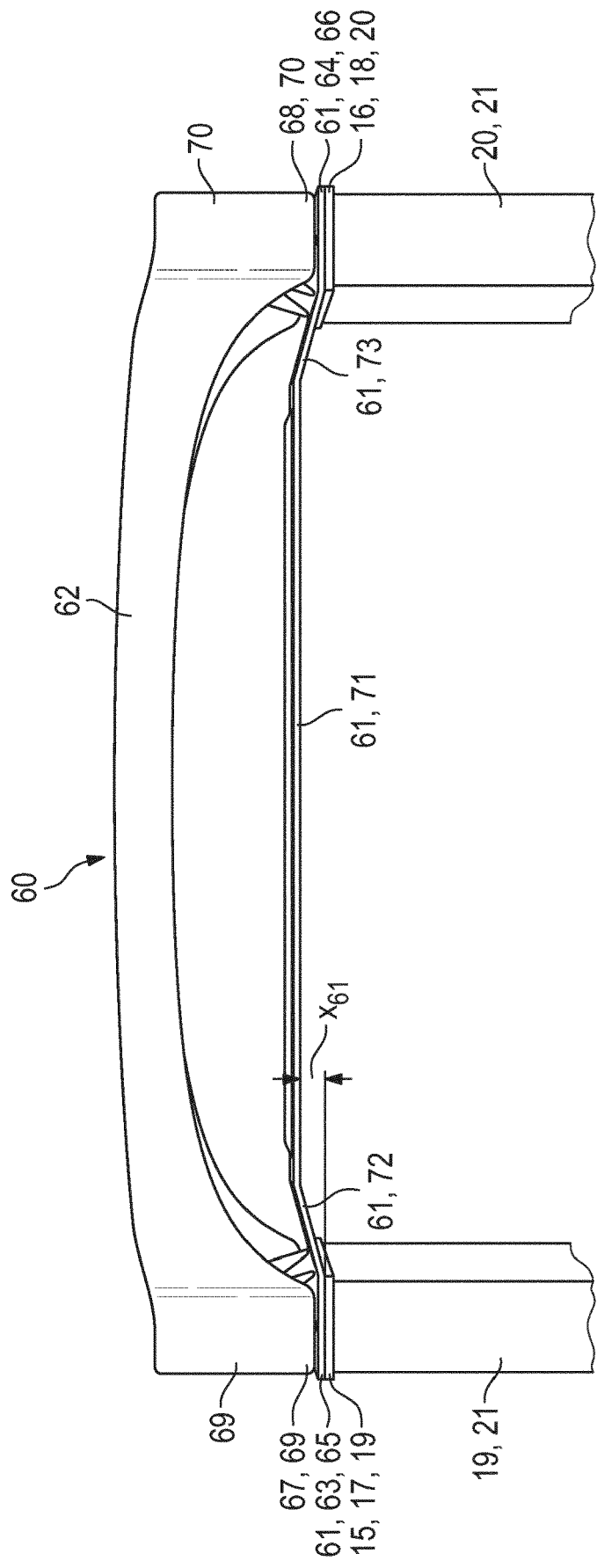
FIG. 9 is a view from above corresponding to FIG. 1 which shows a third embodiment of a bumper assembly.
Figure 10:
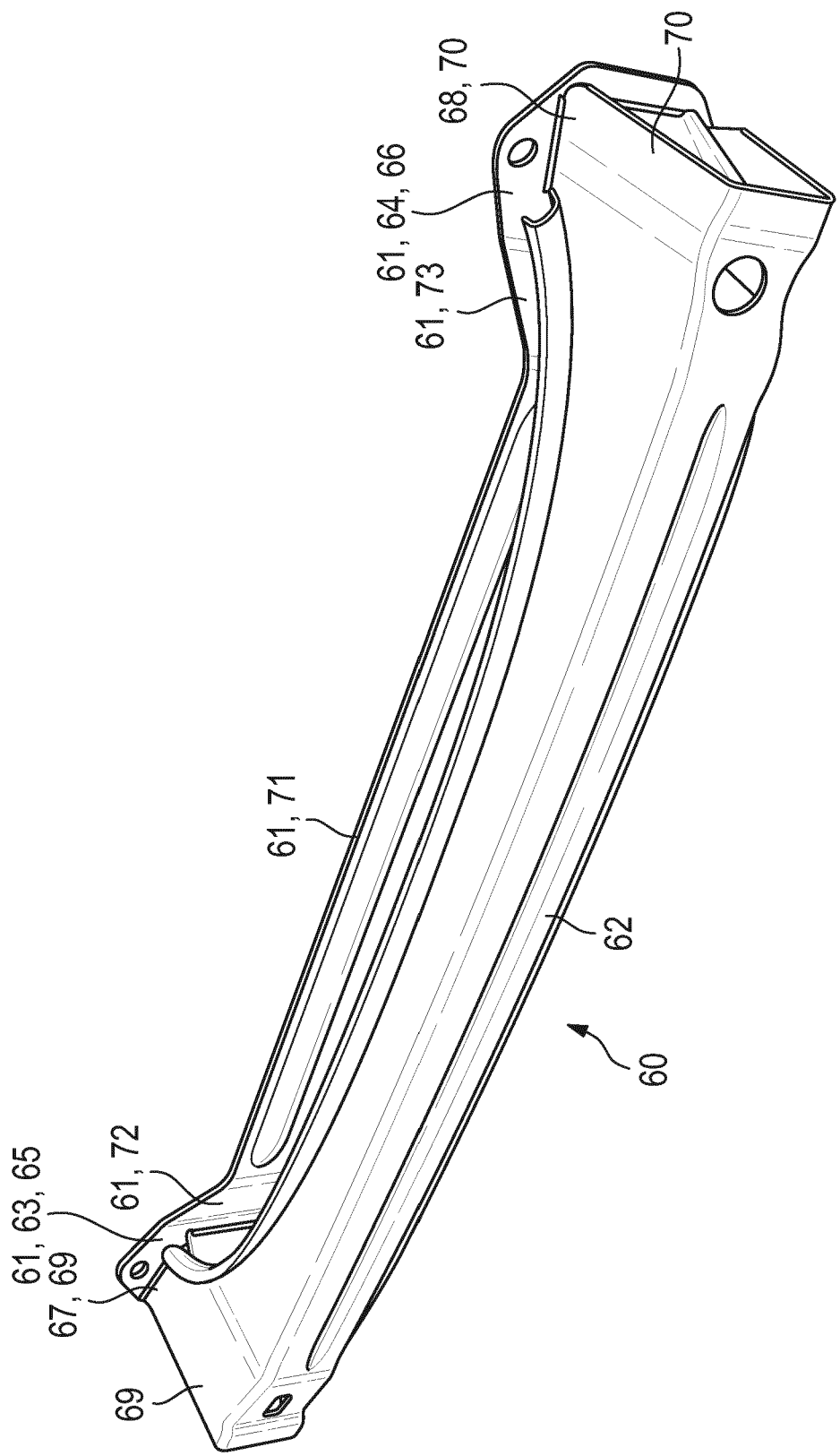
FIG. 10 is a perspective view obliquely from below and from the front, i.e. from the vehicle in the direction of the rear, of the third embodiment of a bumper assembly shown in FIG. 9.
Figure 11:
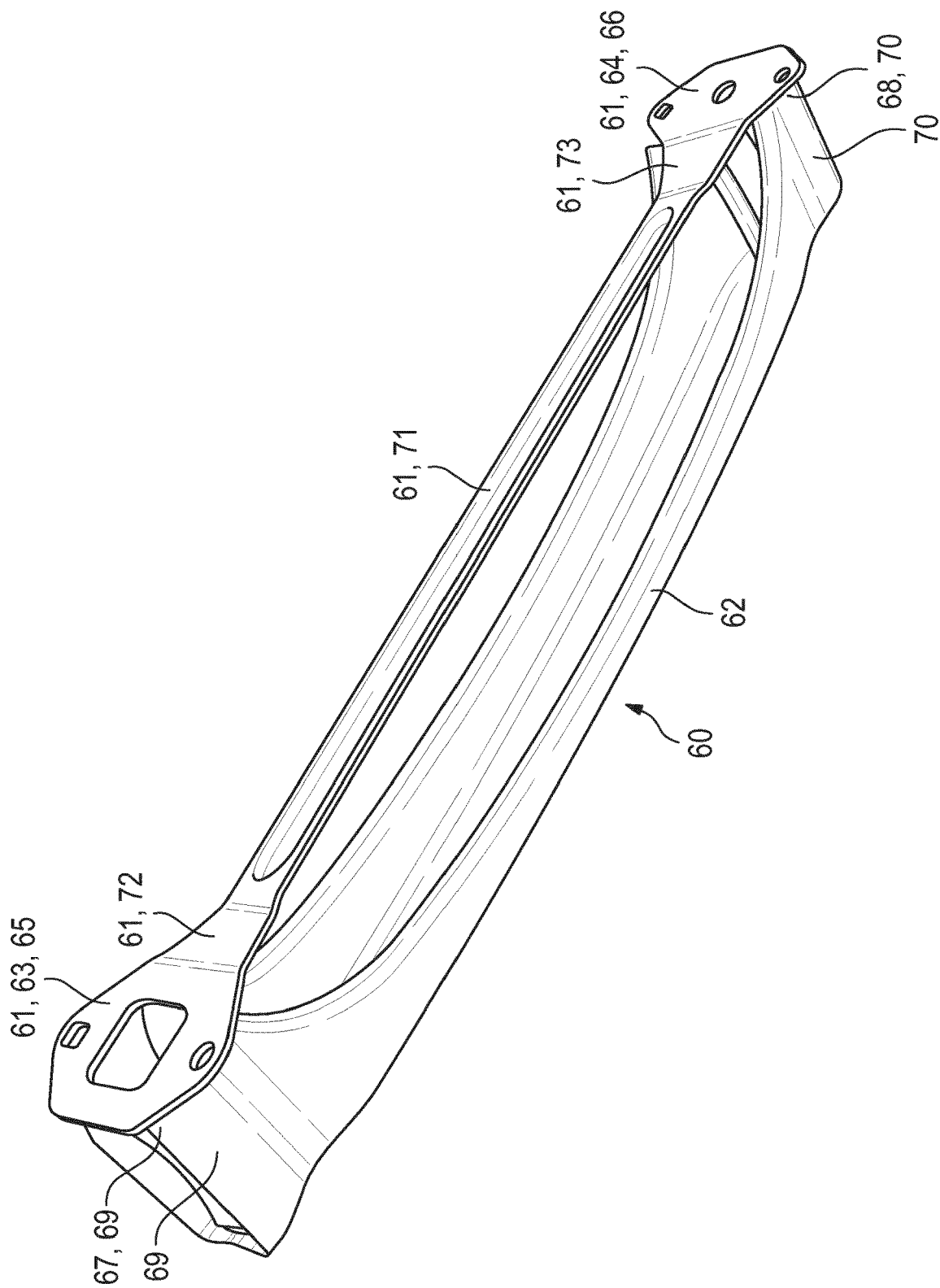
FIG. 11 is a cross-sectional view of the third embodiment of a bumper assembly shown in FIGS. 4 to 6.

FIG. 8 shows an arrangement of the second bumper cross-member 51 approximately in the center of the first bumper cross-member 4, for example level with the transverse web 39.

In FIGS. 1 to 4, the second bumper cross-member 3 of the bumper assembly 3 and in FIGS. 5 to 8 the second bumper cross-member 51 of the bumper assembly 50 is configured as an additional component which is fastened separately to one respective flange plate 13, 14 of a deformation element 7, 8.

In the bumper assembly 3 and the bumper assembly 50, the second bumper cross-member 27 and/or 51 in each case at the two ends 25, 26 has flange portions 31, 32 and/or at the two ends 52, 53 has flange plates 54, 55.

In FIGS. 9, 10, 11, 12 and 13, a second bumper cross-member 61 of a third embodiment of a bumper assembly 60 is integrated on the first bumper cross-member 62.

In the bumper assembly 60 of the third embodiment in FIGS. 9 to 13, one respective end 63, 64 of the second bumper cross-member 61 is integrated in a flange 65, 66, which is configured at one end 67, 68 of one respective deformation element 69, 70, i.e. the respective second flange 31, 32; 54, 55 is absent.

Figure 12:
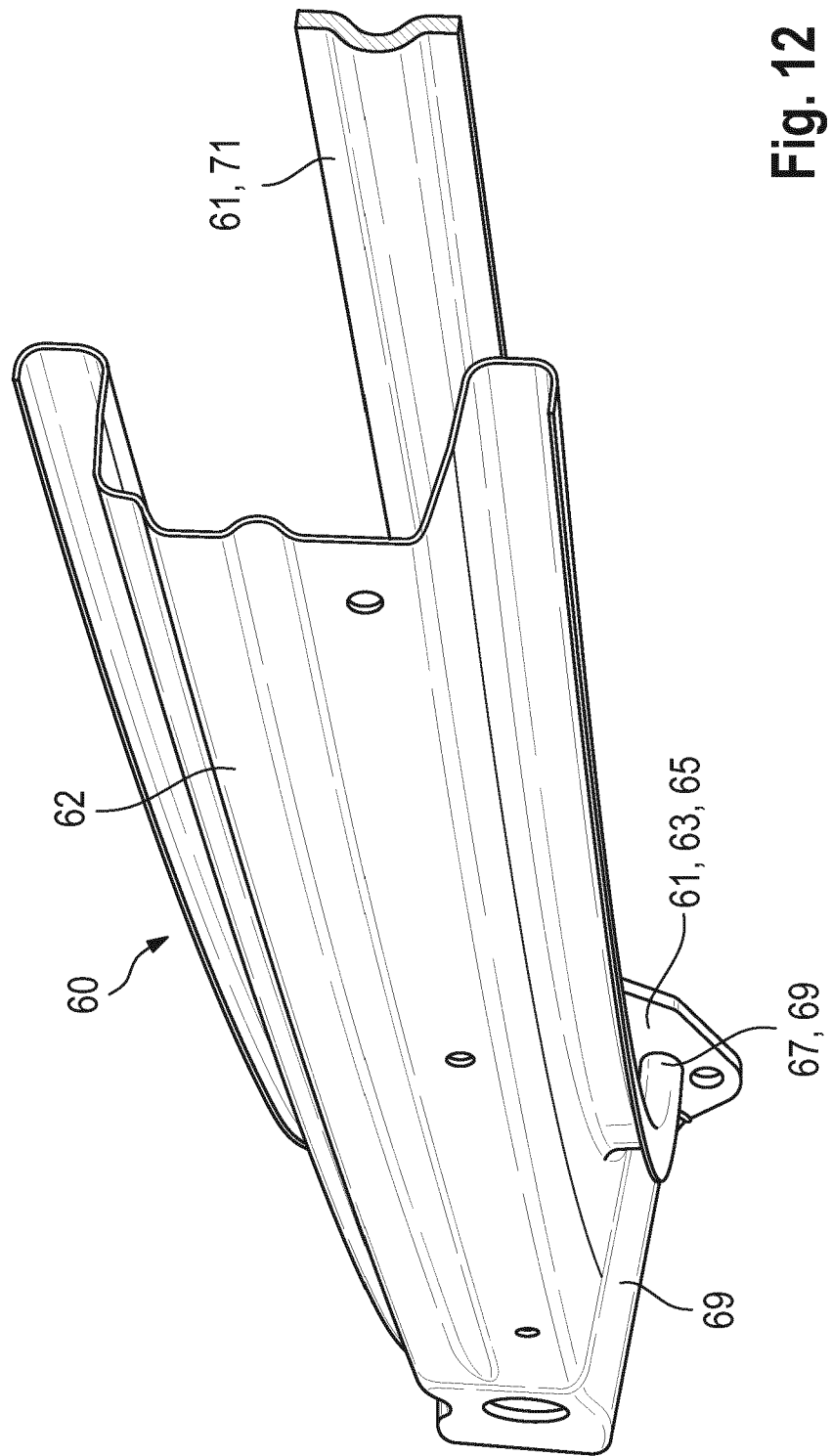
FIG. 12 is a perspective cross-sectional view corresponding to FIG. 10.
Figure 13:
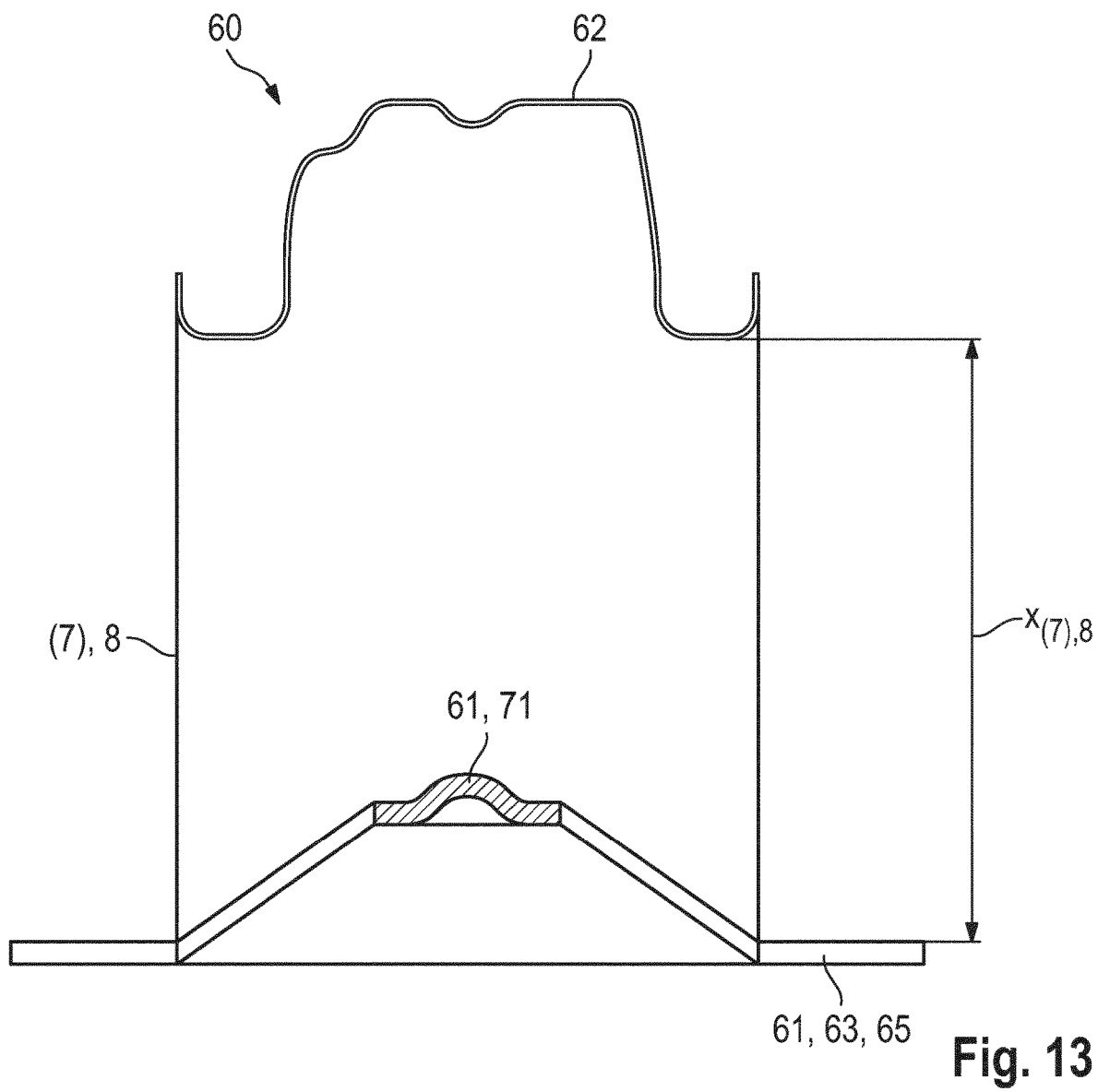
FIG. 13 is a partially shown cross-sectional view corresponding to FIG. 12.

As is revealed from FIGS. 9, 10, 11, 12 and 13, the second bumper cross-member 61 has a central portion 71 with a U-shaped cross section. As in the second embodiment of the bumper assembly 50, the second bumper cross-member 61 corresponding to FIGS. 12 and 13 is approximately centrally arranged relative to the first bumper cross-member 62. As is visible in FIGS. 11, 12 and 13, the first bumper cross-member 62 has an open U-shaped profile.

The second bumper cross-member 61 of the bumper assembly 60 also has two curved bumper cross-member portions 72, 73, as in the case of the second bumper cross-member 51 of the bumper assembly 50. The bumper cross-member portions 72, 73 are shaped such that an offset $x_{61}$ is produced in the vehicle longitudinal direction x toward the first bumper cross-member 62.

In one embodiment, the first bumper cross-member 4 is a closed profile with at least one cavity 40, 41. In a further embodiment, the first bumper cross-member 62 is an open profile.

In one embodiment, the first bumper cross-member 4 with the closed profile is produced from a light metal or from steel and in a further embodiment the first bumper cross-member 62 with an open profile is produced from steel or from light metal.

In one embodiment, the second bumper cross-member 27 is arranged eccentrically relative to the first bumper cross-member 4 and in a further embodiment the second bumper cross-member 51, 61 is arranged centrally relative to the first bumper cross-member 4, 62.

In one embodiment, the second bumper cross-member 27 has a rectangular cross section and in a further embodiment the second bumper cross-member 51, 61, has a U-shaped cross section.

In one embodiment, the second bumper cross-member 27 is produced from a light metal. In a further embodiment, the second bumper cross-member 51, 61 is produced from steel. In a further embodiment, the second bumper cross-member 27, 51, 61 is a textile strip and/or a carbon fiber-reinforced plastics material (CFRP).

So that the safety-relevant components arranged in the rear region, such as a fuel tank and/or a (high voltage) battery or electrical components or the like, remain undamaged or as undamaged as possible, this is achieved by the second bumper cross-member 27, 51, 61 absorbing a portion of the impact energy, in the event of an impact with the first rear bumper assembly 3, 50, 60.

By the offset-rear crash, a vehicle side of the motor vehicle 1 is more deformed by the direct impact than the vehicle side of the motor vehicle 1 which is not directly subjected to the impact. Corresponding to the deformed vehicle side of the motor vehicle 1, the first bumper cross-member 4, 62 on this side is more deformed than on the vehicle side of the motor vehicle 1 which is not subjected to any direct impact.

The first bumper cross-member 4, 62 is stretched by the impact. By the connection of the first bumper cross-member 4, 62 to the two longitudinal members 19, 21, the tensile forces produced thereby are introduced into the respective ends 17, 18 of the longitudinal members 19, 21 arranged thereon, so that the two longitudinal members 19, 21 are stretched.

By the connection of the two longitudinal members 19, 21 to the second bumper cross-member 27, 51, 61, the second bumper cross-member 27, 51, 61 is stretched. As a result, the second bumper cross-member 27, 51, 61 is subjected to tensile force.

In a first load case, the first bumper cross-member 4, 62 remains spaced-apart from the second bumper cross-member 27, 51, 61. In a second load case, a portion of the first bumper cross-member 4, 62 comes to bear against the second bumper cross-member 27, 51, 61. In the two load cases, the second bumper cross-member 27, 51, 61 is subjected to tensile force.

The strength of the second bumper cross-member 27, 51, 61 is designed such that the remaining impact energy which, until the force is taken up by the second bumper cross-member 27, 51, 61 has not been absorbed by the first bumper cross-member 4, 62, is absorbed as far as possible in a non-destructive manner by the second bumper cross-member 27, 51, 61.

In the event of an impact corresponding to the US safety regulations of the Federal Motor Vehicle Safety Standard (FMVSS), such as FMVSS No. 301 and FMVSS No. 305, in these two load cases the second bumper cross-member 27, 51, 61 is designed in terms of its strength such that at least the second bumper cross-member 27, 51, 61 remains intact in the event of an impact.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a body with an underbody, comprising:
   two spaced-apart longitudinal members extending parallel to a vehicle longitudinal direction toward a rear of the motor vehicle;
   a first bumper cross-member of a rear bumper assembly;
   a second bumper cross-member of the rear bumper assembly;
   two deformation elements of the rear bumper assembly, one deformation element in each case being connected at one end to a rear end of a respective longitudinal member and to one end of the second bumper cross-member, wherein
   the first bumper cross-member is connected at each end to the other end of a respective deformation element,
   the second bumper cross-member is arranged completely spaced-apart from the first bumper cross-member in the vehicle longitudinal direction by at least the length of the respective deformation elements, and
   the second bumper cross-member is arranged with a vertical offset relative to the first bumper cross-member.

2. The motor vehicle as claimed in claim 1, wherein the first bumper cross-member is a closed profile with at least one cavity.

3. The motor vehicle as claimed in claim 1, wherein the first bumper cross-member is produced from a light metal or from steel.

4. The motor vehicle as claimed in claim 1, wherein the second bumper cross-member has a rectangular cross section.

5. The motor vehicle as claimed in claim 1, wherein one of:
the second bumper cross-member is produced from a light metal.

6. The motor vehicle as claimed in claim 1, wherein
in the bumper assembly the first bumper cross-member is a closed profile with at least one cavity and is produced from one of: steel or a light metal, and
the second bumper cross-member spaced-apart therefrom is produced from one of:
steel, a light metal, a textile material or a carbon fiber-reinforced plastics material.

7. The motor vehicle as claimed in claim 1, wherein
in the bumper assembly, the first bumper cross-member is an open profile and is produced from one of: steel or a light metal, and
the second bumper cross-member spaced-apart therefrom is produced from one of:
steel, a light metal, a textile material or a carbon fiber-reinforced plastics material.

8. The motor vehicle as claimed in claim 1, wherein
the first bumper cross-member is an open profile.

9. A motor vehicle having a body with an underbody, comprising:
two spaced-apart longitudinal members extending parallel to a vehicle longitudinal direction toward a rear of the motor vehicle;
a first bumper cross-member of a rear bumper assembly;
a second bumper cross-member of the rear bumper assembly;
two deformation elements of the rear bumper assembly, one deformation element in each case being connected at one end to a rear end of a respective longitudinal member and to one end of the second bumper cross-member, wherein
the first bumper cross-member is connected at each end to the other end of a respective deformation element,
the second bumper cross-member is arranged completely spaced-apart from the first bumper cross-member in the vehicle longitudinal direction by at least the length of the respective deformation elements, and
the second bumper cross-member is arranged in a vertical direction centrally relative to the first bumper cross-member.

10. The motor vehicle as claimed in claim 1, wherein
the second bumper cross-member has a cross-sectional profile configured to increase a geometric moment of inertia.

11. The motor vehicle as claimed in claim 1, wherein
the second bumper cross-member is made from steel.

12. The motor vehicle as claimed in claim 1, wherein
the second bumper cross-member is a textile material or a carbon fiber-reinforced plastics material.

13. The motor vehicle as claimed in claim 9, wherein
the first bumper cross-member is a closed profile with at least one cavity.

14. The motor vehicle as claimed in claim 9, wherein
the first bumper cross-member is produced from a light metal or from steel.

15. The motor vehicle as claimed in claim 1, wherein
the second bumper cross-member has a rectangular cross section.

16. The motor vehicle as claimed in claim 1, wherein one of:
the second bumper cross-member is produced from a light metal.

17. The motor vehicle as claimed in claim 9, wherein
in the bumper assembly the first bumper cross-member is a closed profile with at least one cavity and is produced from one of: steel or a light metal, and
the second bumper cross-member spaced-apart therefrom is produced from one of:
steel, a light metal, a textile material or a carbon fiber-reinforced plastics material.

18. The motor vehicle as claimed in claim 1, wherein
in the bumper assembly, the first bumper cross-member is an open profile and is produced from one of: steel or a light metal, and
the second bumper cross-member spaced-apart therefrom is produced from one of:
steel, a light metal, a textile material or a carbon fiber-reinforced plastics material.

* * * * *